Dec. 19, 1922.

P. C. SCHMIDT,
SELF ALIGNING BALL BEARING,
FILED JAN. 20, 1922.

1,439,486

Inventor
Paul C. Schmidt.

Patented Dec. 19, 1922.

1,439,486

UNITED STATES PATENT OFFICE.

PAUL C. SCHMIDT, OF SHEEPSHEAD BAY, NEW YORK.

SELF-ALIGNING BALL BEARING.

Application filed January 20, 1922. Serial No. 530,616.

*To all whom it may concern:*

Be it known that I, PAUL C. SCHMIDT, a citizen of the United States, residing at Sheepshead Bay, in the county of Kings and State of New York, have invented a new and useful Improvement in Self-Aligning Ball Bearings, of which the following is a specification.

This invention relates to improvements in self-aligning ball bearings, the object of the invention being to provide a device of this character which is of a simple construction, which may be made without a ball cage, which allows the insertion of the largest possible number of balls to increase the carrying capacity and which will perform its function with ease and accuracy, as described in the following specification, having reference to the accompanying drawing, in which—

Figure 2:
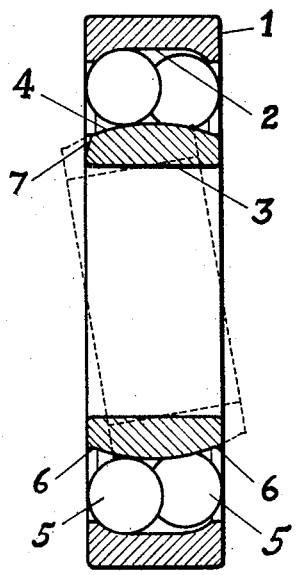
Figure 1:
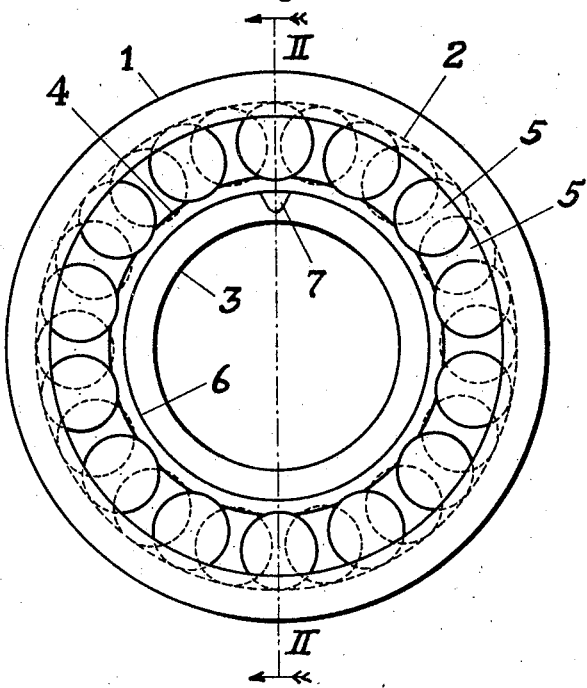

Fig. 1 is a view showing one form of the ball bearing embodying my invention, and Fig. 2 is a view showing a cross section of Fig. 1 taken on line II—II looking in the direction of the arrows.

Similar numerals refer to similar parts in each of the several views.

In Fig. 1 of the drawing numeral 1 designates an external casing member having a ball race 2. An inner casing member 3 is provided with a spherically formed convex outer surface 4. Two rows of balls 5—5 are arranged between the ball race 2 and the spherically formed convex surface 4. To prevent the balls from falling out when the axis of the external casing member is at its largest angle with the axis of the inner casing member (see Fig. 2), the spherically formed convex surface 4 is provided at its ends with ring-shaped projections 6, having a notch 7 for the insertion of the balls.

While I have illustrated and described in detail one preferred embodiment of the invention, it will be understood that various changes as to shape, proportion, arrangement, etc., which fall within the scope of the appended claim, may be made if desired.

What I claim is:

In a self-aligning ball bearing, in combination an external casing member having one or more ball races in its inner surface, an inner casing member, said inner casing member provided with a spherically formed convex outer surface and ring-shaped projections on both ends of the spherical surface and one or more notches in the said ring-shaped projections, and one or more ball rows arranged between said ball races and the spherical outer surface of said inner member.

PAUL C. SCHMIDT.